United States Patent
Keuk et al.

(10) Patent No.: US 8,753,443 B1
(45) Date of Patent: Jun. 17, 2014

(54) UNIVERSAL TINT PASTE HAVING HIGH SOLIDS

(71) Applicants: Jasmine Keuk, Rowlett, TX (US); Paul Anthony Lum, Irving, TX (US); Michael S. Davis, Wylie, TX (US); Miguel Angel Gutierrez, Carrollton, TX (US); Chiew W. Koay, Richardson, TX (US); Douglas E. Johnston, Jr., Fort Worth, TX (US); Carolina A. Flanigan, Mesquite, TX (US); Larry Dale Wyman, Dallas, TX (US); Roland L. Gasmena, Carrollton, TX (US)

(72) Inventors: Jasmine Keuk, Rowlett, TX (US); Paul Anthony Lum, Irving, TX (US); Michael S. Davis, Wylie, TX (US); Miguel Angel Gutierrez, Carrollton, TX (US); Chiew W. Koay, Richardson, TX (US); Douglas E. Johnston, Jr., Fort Worth, TX (US); Carolina A. Flanigan, Mesquite, TX (US); Larry Dale Wyman, Dallas, TX (US); Roland L. Gasmena, Carrollton, TX (US)

(73) Assignee: Jones-Blair Company, Dallas, TX (US)

( * ) Notice: Subject to any disclaimer, the term of this patent is extended or adjusted under 35 U.S.C. 154(b) by 0 days.

(21) Appl. No.: 13/732,801

(22) Filed: Jan. 2, 2013

(51) Int. Cl.
| | | |
|---|---|---|
| *C09D 17/00* | (2006.01) | |
| *C08G 77/18* | (2006.01) | |
| *C08L 83/00* | (2006.01) | |
| *C09D 183/00* | (2006.01) | |
| *C09C 3/12* | (2006.01) | |

(52) U.S. Cl.
CPC .............. *C09D 17/00* (2013.01); *C08G 77/18* (2013.01); *C08L 83/00* (2013.01); *C09D 183/00* (2013.01); *C09C 3/12* (2013.01)

USPC .............. 106/446; 525/10; 525/43; 525/474; 524/588

(58) Field of Classification Search
USPC ............................................. 106/446
See application file for complete search history.

(56) References Cited

U.S. PATENT DOCUMENTS

| 2,415,389 | A | * | 2/1947 | Hunter et al. ................ 556/457 |
|---|---|---|---|---|
| 3,653,952 | A | | 4/1972 | Gagliardi |
| 4,261,848 | A | | 4/1981 | Reedy et al. |
| 4,383,062 | A | | 5/1983 | Saad et al. |
| 4,578,266 | A | * | 3/1986 | Tietjen et al. .................. 424/63 |
| 4,810,305 | A | * | 3/1989 | Braun et al. .................. 106/499 |
| 5,736,619 | A | | 4/1998 | Kane et al. |
| 5,934,513 | A | | 8/1999 | Bellas |
| 6,255,513 | B1 | | 7/2001 | Standke et al. |
| 6,638,618 | B2 | | 10/2003 | Hayashi et al. |
| 6,835,457 | B2 | | 12/2004 | Larson, Jr. et al. |
| 7,151,123 | B2 | | 12/2006 | Ramsey |
| 7,351,783 | B1 | * | 4/2008 | Perala et al. .................... 528/27 |

(Continued)

FOREIGN PATENT DOCUMENTS

| JP | 2008195742 | 8/2008 |
|---|---|---|
| WO | WO 2008/027280 A2 | 3/2008 |

OTHER PUBLICATIONS

Dow Corning 3074 Data Sheet.*
Ferro Corporation, PDI Type 61 Silicone Data Sheet ("PDI").*

*Primary Examiner* — Mark Kaucher
*Assistant Examiner* — Kregg Brooks
(74) *Attorney, Agent, or Firm* — Locke Lord, LLP

(57) ABSTRACT

The invention relates to a high solids tint paste that is preferably substantially free of solvents that are volatile organic compounds. Preferably the universal tint paste is 100% solids and substantially free of any solvents. The universal tint paste is formed using a functional silicone resin intermediate that is end-capped with an alcohol, catalyzed to form a silicone resin product and combined with one or more desired pigments. The universal tint paste preferably can be used in a wide variety of solvent-borne and high solids coatings.

39 Claims, 4 Drawing Sheets

(56) References Cited

U.S. PATENT DOCUMENTS

| | | |
|---|---|---|
| 7,601,425 B2 | 10/2009 | Stoffer et al. |
| 7,732,552 B2 | 6/2010 | Lejeune et al. |
| 7,834,121 B2 | 11/2010 | Mowrer et al. |
| 7,985,821 B2 | 7/2011 | Lejeune et al. |
| 8,193,293 B2 | 6/2012 | Martz et al. |
| 2003/0077448 A1 | 4/2003 | Ueta et al. |
| 2004/0146473 A1 | 7/2004 | Lion |
| 2005/0267258 A1* | 12/2005 | Rajaraman et al. ............ 524/863 |
| 2007/0179268 A1 | 8/2007 | Lejeune et al. |
| 2008/0092778 A1* | 4/2008 | Bauer et al. .................... 106/419 |
| 2008/0318012 A1 | 12/2008 | Domnick et al. |
| 2009/0126602 A1* | 5/2009 | Murphy et al. ................ 106/251 |
| 2010/0216960 A1 | 8/2010 | Ahrens et al. |
| 2010/0217016 A1 | 8/2010 | Lejeune et al. |
| 2011/0232531 A1 | 9/2011 | Gotz et al. |
| 2011/0282024 A1 | 11/2011 | Weissenbach et al. |

* cited by examiner

UNIVERSAL TINT PASTE HAVING HIGH SOLIDS

BACKGROUND

1. Field of the Invention

The invention relates to a universal tint paste having a high solids content and in particular to a universal tint paste for solvent-borne and high solids coatings that is substantially entirely solids.

2. Description of Related Art

Protective coatings serve to primarily preserve substrate integrity, but an important secondary function is to provide an aesthetically pleasing appearance to the substrates they protect. Pigments are a significant contributor to the overall visual appeal of a coating by adding gloss, opacity and color. In some cases, the aesthetics of the coating may be the deciding factor for a customer's purchase.

Coatings can be manufactured with the necessary pigments to provide the desired color, opacity, gloss and other desired characteristics. However, in order to increase the variety of colors and other properties that are available, manufacturers often will produce base coatings to which pigments are later added to produce a final coating having the desired color and other properties. The average consumer is more familiar with this in the context of purchasing paint from a retail store, where an automated system is used to add various pigments to a neutral base of the desired coating type to provide a final paint product having the desired color. Even when a coating product with the desired color and other properties is produced directly in a manufacturing facility, tint production batches are often manufactured separately and then added to the coating product prior to being packaged. In both cases, a separate composition is used to add the necessary pigments that provide the desired color, opacity, gloss and other desired characteristics to the particular base coating. The composition used to add the pigments to the base coating are considered tint pastes, but are also known as tint concentrates or colorants.

Tint pastes are made by dispersing pigments into a resinous vehicle. Traditional, commercially available tint pastes employ the use of surfactants, defoamers, wetting agents and solvents to assist in the dispersion of pigments into the resin. In some cases the pigments in solvent based tint pastes have a tendency to settle. This settling affects the distribution of the pigments in the tint paste. Given that the tint pastes are highly concentrated, even minor variations in the distribution of the pigments in the tint paste can have a noticeable effect on the color of the resulting coating. This is especially problematic in manufacturing facilities using tint production batches as the batches can be large and thus are more susceptible to variations in color etc. as a result of settling of the pigments.

In addition, solvents are major contributors of volatile organic compounds (VOCs). VOCs have been shown to cause harm to the environment and/or humans and animals. Due to a higher demand for eco-friendly products as well as conformance to increasingly strict environmental regulations, there is growing interest for low or non-volatile organic compound colorants.

Low-VOC tint pastes have been developed and are becoming commercially available in today's markets. However, they generally still rely on the use of solvents and simply exchange the prior more hazardous solvents for ones that are considered less hazardous and thus are currently exempt from the VOC restrictions and regulations. As the laws and regulations become more restrictive with respect to VOCs, these solvents may no longer enjoy their current exemption thereby eliminating these tint pastes as being low-VOC qualified products. Further, the VOC compliant tint pastes often have limited compatibility across different types of coating systems including for example, acrylics, polyurethanes, epoxies, alkyds, polyesters, room-temperature vulcanization silicones, cab lacquers, vinyl's, thermosets, thermoplastics and combinations thereof. These VOC compliant tint pastes also still require the use of additives and solvents in order to disperse the pigment, and, in some cases, improve compatibility with certain coating systems.

Existing solids colorants still contain additives and surfactants to aid in the dispersion and wetting of dry pigments. These colorants are carbon-based and therefore limited to specific coating systems.

Consequently, there is still a need for a tint paste that does not require the use of VOCs or other solvents and is compatible with a variety of coating systems.

BRIEF DESCRIPTION OF THE INVENTION

It has been discovered that pigments can be added to a silicon resin created from a functional silicone resin intermediate that is end-capped with an alcohol to form a tint paste that has a high solids content and is preferably substantially 100% solids and is thus substantially free of any solvents. Preferably the silicone resin intermediate is a methoxy functional methyl phenyl silicone resin intermediate that is end capped with an alcohol selected from a group consisting of benzyl alcohol, ethanol, n-propanol, n-butanol and all isomers and combinations thereof. The universal tint paste preferably can be used in a wide variety of solvent-borne and high solids coatings.

BRIEF DESCRIPTION OF THE FIGURES

For a more complete understanding of the present invention and for further advantages thereof, reference is now made to the following description taken in conjunction with the accompanying drawings in which.

DESCRIPTION OF THE PREFERRED EMBODIMENTS

Figure 1:
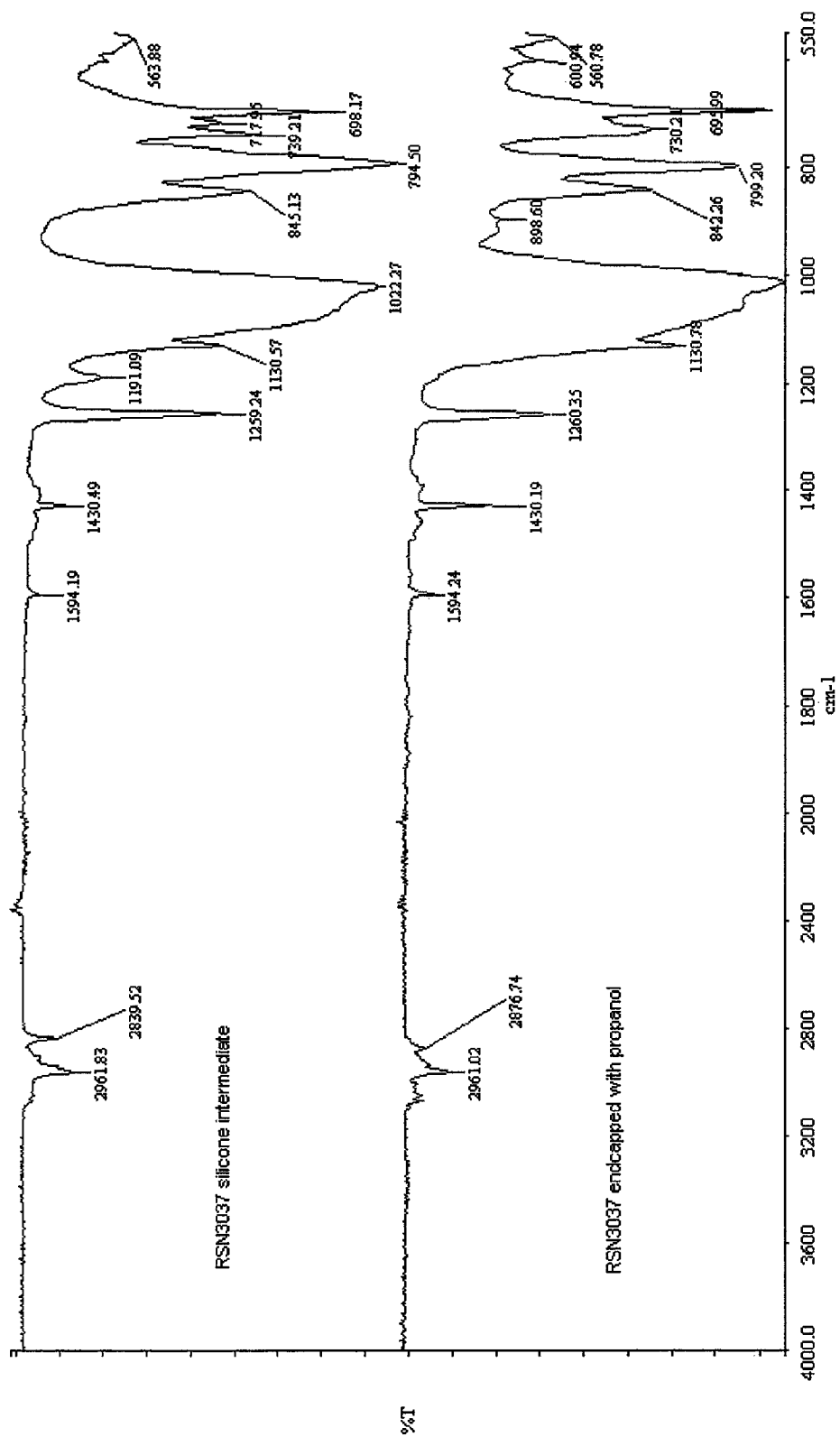
FIG. 1 is a graph of an FTIR analysis of a propanol-encapped RSN3037 showing the percent transmittance on the ordinate axis and the wavelength in $cm^{-1}$ on the abscissa axis.

The present invention can be better understood by the following discussion of the manufacture and use of certain preferred embodiments. All data disclosed below regarding time, temperature, amount of components, concentration in % by weight, etc. are to be interpreted as also including all values lying in the range of the respective measuring accuracy known to the person skilled in the art. Unless otherwise stated, technical grades of the various materials were used in the preferred embodiments.

In the preferred embodiment, the high solids tint paste is created by adding one or more pigments in an amount of from 10% up to the critical pigment volume concentration (CPVC)

based on the resin weight to an alcohol endcapped silicone resin. The silicon resin is preferably a methoxy functional methyl phenyl silicone resin intermediate and the alcohol is preferably selected from a group consisting of benzyl alcohol, ethanol, n-propanol, n-butanol and all isomers and combinations thereof. The resulting endcapped silicone resin is chemically inert and serves as a dispersant and carrier for the pigment in the tint paste.

The preferred embodiment of the tint paste of the current invention is 100% solids and is compatible with various solvent-borne and high solids coating systems including but not limited to acrylics, polyurethanes, alkyds, silicone, polyesters, acrylic polyesters, room-temperature vulcanization silicones, epoxies, cab lacquers, vinyls, thermosets and thermoplastics. Drawdowns of the tinted coating systems show excellent color acceptance and improved hiding. Improved hiding can be evidenced by the opacity of the draw down film as measured against the black and white portion of the leneta card. Drawdowns of the tinted coating systems also show minimal color float and mottling as reflected in the DL values between the "rub-up" area and the unaffected area on leneta drawdown cards. The resulting conclusion is that the application range of the preferred tint paste is universal.

The preferred endcapped methyl phenyl silicone resin for use in the tint paste of the current invention is preferably prepared using the reaction pathway set forth below:

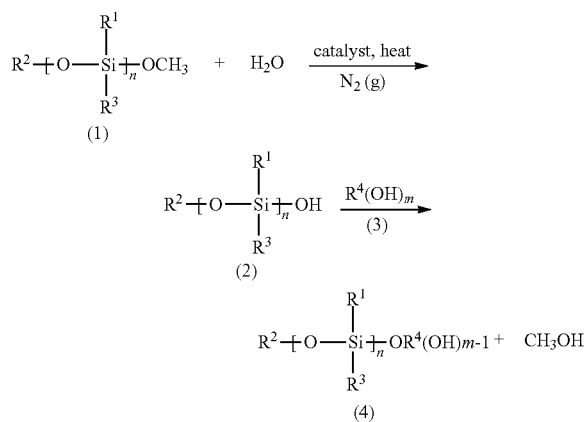

This process generally involves starting with an alkoxy functional or silanol functional silicone intermediate where, $R^1$, $R^2$ and $R^3$ individually correspond to methyl, phenyl or alkyl groups and n is greater than zero. If using a methoxy functional silicone intermediate, the compound, shown as compound 1, is heated along with water and a catalyst under a nitrogen purge to form a silanol function silicon, shown as compound 2, through a hydrolysis reaction. The catalyst employed in this reaction was chosen from a group consisting of organometallics, acids and bases.

When using a silanol functional intermediate instead of a methoxy functional intermediate, the hydrolysis step can be surpassed and the attachment of the alcohol shown as compound (3) can proceed using the same catalyst. An alcohol is added to the mixture, and reacted for a period of time to endcap the silicon resin. The alcohol is shown as compound (3) where $R^4$ corresponds to an alkyl group having 1-7 carbons or phenyl group to form an alcohol including the following and isomers and mixtures thereof: ethanol, propanol, butanol and so on, benzyl alcohol and low molecular weight diols and m is equal to 1-2. The resulting compound (4) is the alcohol endcapped silicone resin used in the current invention.

The preferred silicone resin intermediate to use is Xiameter® RSN3037 (MW 800-1300). Xiameter is a registered trademark of and is available from Dow Corning of Midland, Mich. It is preferred in part due to its low viscosity (less than 100 cps), the 0.5:1 ratio of phenyl and methyl substituent groups and 0-20% alkoxy functionality. Other preferred intermediates include Silres® IC 232 (alkoxy content 0-20%), Silres® IC 368 (alkoxy content 0-20%) and Silres® IC 836 (MW 1200-1500). Silres® is a registered trademark of and available from Wacker Chemie AG of Munich, Germany. Additional preferred silicon resin intermediates that are available from Dow Corning include, RSN0217 (MW 1500-2500), RSN0220 (MW 2000-4000), RSN0233 (MW 2000-4000), RSN0249 (MW 2000-4000), RSN0255 (MW 2500-4500), RSN0409 (MW 2000-7000), RSN0431 (MW 2000-7000), RSN0804 (MW 2000-7000), RSN0805 (MW 200,000-300,000), RSN0806 (MW 200,000-300,000), RSN0808 (MW 200,000-300,000), RSN0840 (MW 2000-7000), RSN3074 (MW 1000-1500) (which is also available from Wacker Chimie AG as SY 231), RSN6018 (MW 1500-2500) and RSN5314 (alkoxy content 30-40%) and other open-chained, cyclic or branched polysiloxanes and chlorosilanes.

The preferred catalyst is tetra butyl titanate, which is available from Sigma Aldrich of St. Louis. Mo., VWR of Radnor, Pa., Alfa Aesar of Ward Hill, Mass. and Fischer Scientific of Hampton, N.H. Other suitable catalysts include acids and bases such as para-toluenesulfonic acid, phosphoric acid, which is available from Ricca Chemical of Arlington, Tex., sulfuric acid (Ricca Chemical) and alkali metal hydroxides (Sigma-Aldrich, VWR, Alfa Aesar); organometallic and metallic catalysts such as dibutyl tin dilaurate (which is available from Dura Chemicals Inc, of Emeryville, Calif. or OMG Americas Inc of Franklin, Pa.), tetra isopropyl titanate, cobalts and zirconiums (Sigma Aldrich, VWR, Alfa Aesar, Fischer Scientific). The percentage of catalyst added can vary from 0.01% up to 5.00% of the total formula weight.

Propanol is particularly preferred as the alcohol used to endcap the silicone intermediate. Without being bound to theory, it is currently believed that the size and linear structure of propanol allows for 100% endcapping while not negatively affecting the viscosity of the final product. It is also unlikely that reverse hydrolysis of the attached alcohol will occur due to its relatively higher molecular weight. Other preferred alcohols include, ethanol, isopropanol, butanol, benzyl alcohol and low molecular weight diols, as well as mixtures of any of the above.

The endcapped silicone resin is combined with one or more pigments in order to produce the final tint paste. The amount of pigments used can be any amount up to the critical pigment volume concentrate (cPVC), which will differ based upon the particular pigment or pigments that are used. While lower percentages of dry pigment loading can be used, it is preferred that an amount of pigment is used that is equal to or greater than the typical dry pigment loading levels of tint pastes currently on the market up to the cPVC for the particular pigment. The pigments are preferably dispersed in the resin using a mixer, such as the DAC 400 FVZ speed mixer, in combination with glass beads or zirconium beads (if necessary). The pigments are preferably dispersed in the mixer until a fineness of grind of 6-7 or greater on the Hegman scale is achieved. Zirconium beads are considered necessary instead of glass beads when prolonged milling is required as the zirconium beads do not wear readily as glass or ceramic beads.

In the context of this invention, the word "pigments" refers to any organic or inorganic insoluble solid that imparts color to a coating. The pigments preferred for use in the tint paste of the current invention, includes any known pigments used in coating products, including but not limited to Diketo pyrolo pyrrole red (DPP red), Phthalocyanine blue (red shade), Carbon black, Lamp black, Quinacridone red, Organic yellow (green shade), Titanium dioxide, azo and monoazo pigments, diazo pigments, condensation pigments, salt pigments, metal complexes, arylamide and diarylamide pigments, quinophthalone, anthrapyrimidine, flavathrone, pyrazolone, perinone, beta-napthol, dibromanthrone, pyranthrone, diketopyrrolo pyrrole, indanthrone, isoindoline and isoindolinone pigments and benzimidazolones; polycyclic pigments such as anthraquinone pigments, phthlaocyanine pigments, halogenated phthlaocyanine pigments, quinacridone pigments, dioxazine pigments, naphthalene tetracarboxylic acid pigments, perylene pigments and thioindigo pigments; inorganic pigments such as carbon black, Prussian blue, Ultramarine blue, titanium dioxide, iron oxides, zinc oxides, zinc chromates, azurite, chromium oxides, cadmium sulphides and lithopone; and near-infrared (NIR) pigments. NIR pigments, also called mixed metal oxides (MMO) or complex inorganic colored pigments (CICP) consisting of Manganese, Antimony Titanium, Cobalt, Aluminum, Lithium, Nickel, Zinc, Copper, Chromium, and Iron.

The resulting tint pastes have excellent compatibility in high solids and solvent-borne coatings including but not limited to acrylics, polyurethanes, epoxies, alkyds, polyesters, room-temperature vulcanization (RTV) silicones, vinyls, cab lacquers, thermosets and thermoplastics and combinations thereof. Compatibility in various coatings can be determined by the DL values (to measure color float) and visual (qualitative) inspection of the drawdowns.

The introduction of a 100% solids silicone tint paste will not only keep VOCs very low, but it has even shown to have greater pigment loading capability (i.e. more concentrated formula). This advantage will enable users to use less tint paste while leaving the original properties of the coating unaffected. This universal tint paste has demonstrated a newfound capability of tinting silicone roof systems into "non-traditional" colors which was not possible using commercially available tint pastes. This ability is expected to dramatically change the coatings industry.

The invention can be further understood by means of the following examples, which are provided to illustrate but not limit the invention.

Example 1

A 1000-mL round bottom reaction flask was equipped with a heating mantle, stirrer, a Dean-Stark trap, condenser and nitrogen purge. To the flask 500 grams of RSN3037, which is a methoxy functional methyl phenyl silicone intermediate having 6.67 mol hydrolysable groups, was added. To the intermediate was added 2.5 grams of tetra butyl titanate (which is 0.5% based on the weight of the silicone intermediate) followed by 1.67 mols of water under stirring. Following the addition of the water, the mixture turned hazy. The mixture was heated up to 120° F. and then increased 10° F. every 10-15 minutes until a final temperature of 200±10° F. was reached. The temperature was maintained within the range of 140°-200° F. until a predetermined amount of methanol was collected, which in this case was 1.67 moles (53.4 grams). At this point the mixture turned from hazy to clear again. The temperature was then lowered to 175° F. and 300.5 grams of propanol (5.0 mols) was added to the reaction vessel. The batch was held at this temperature for 1.5 hours. The temperature was increased to 200±10° F. and held within the range of 200-300° F. until the predetermined amount of methanol and excess propanol were collected. The progress of the reaction was monitored using GC (to analyze the distillate) and FTIR (to analyze the resin). Vacuum distillation may be utilized to help draw off solvent. When the distillation ceased, the batch was cooled down to room temperature. Product yield is estimated as at least 97%.

Example 2

The procedure of Example 1 was repeated, with the exception that 50 grams (0.33 mol) of resin was used and 36.7 grams of n-butanol (corresponding to 0.5 mol) was used as the alcohol instead of propanol. Product yield is estimated as at least 97%.

Example 3

The procedure of Example 1 was repeated, with the exception that 50 grams (0.33 mol) of resin was used and 54.1 grams of benzyl alcohol (corresponding to 0.5 mol) was used in place of propanol. The product yield is 80-95%, which is believed to be due to the steric hindrance contributed by the benzyl group.

Example 4

The procedure of Example 1 was repeated, with the exception that 50 grams (0.33 mol) or resin was used, 30.1 grams of isopropanol (corresponding to 0.5 mol) was used in place of propanol and the catalyst was changed to tetra isopropyl titanate. Product yield is an estimated 80-95%.

The resulting preferred endcapped silicone resins will preferably be from about 98 to about 100% solids and most preferably about 100% total non-volatiles, have a weight per gallon at 25° C. of from about 8.60 to about 8.80 lbs/gal, a Brookfield viscosity at 25° C. of from about 85 to about 120 cps and more preferably from about 100 to about 120 cps, a color (as measured on the Gardner scale) of from about 0 to about 1, and a haze that is clean and sparkling bright.

Figure 2:
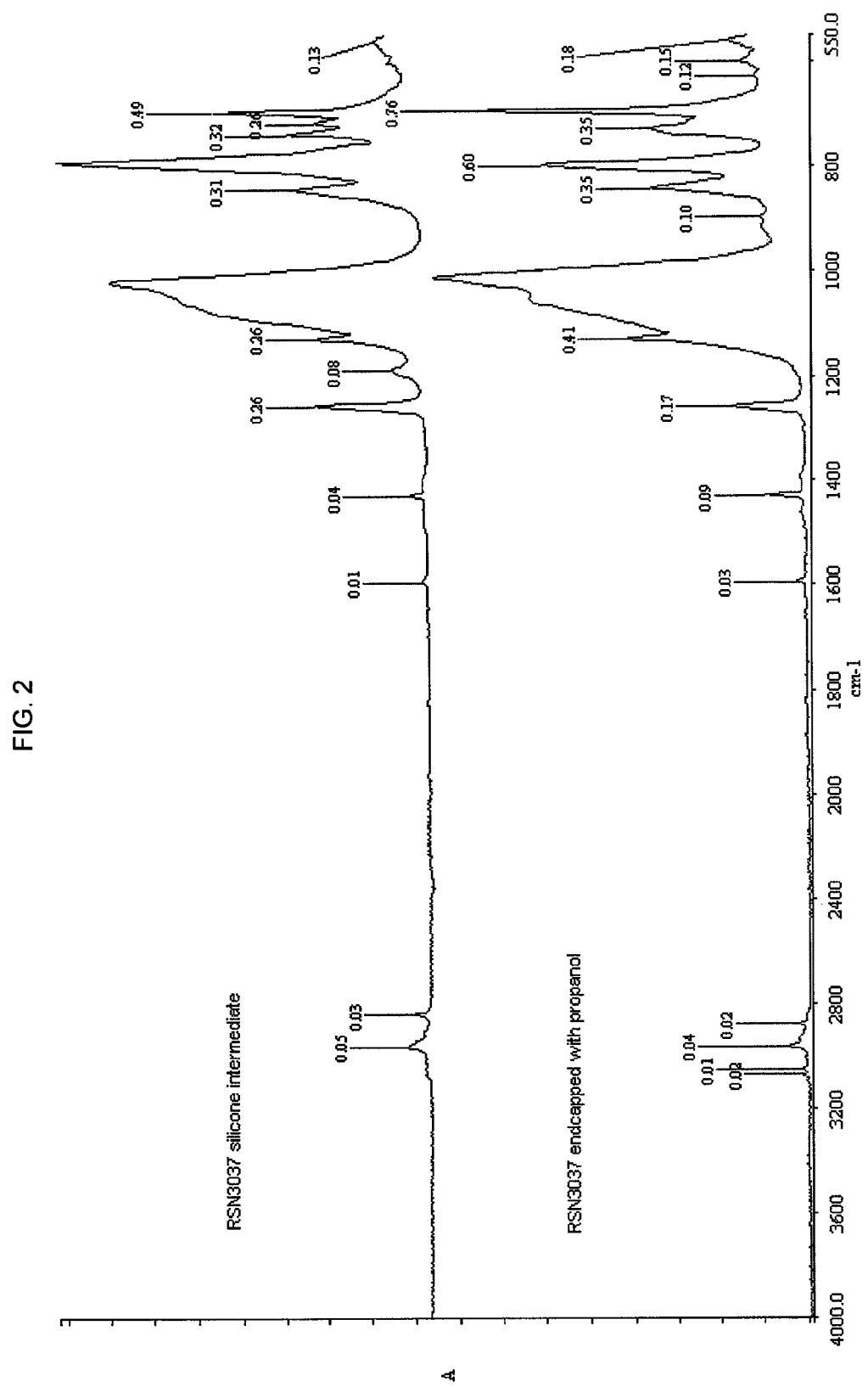
FIG. 2 is a graph of an FTIR analysis of a propanol-encapped RSN3037 showing the absorbance on the ordinate axis and the wavelength in $cm^{-1}$ on the abscissa axis.
Figure 3:
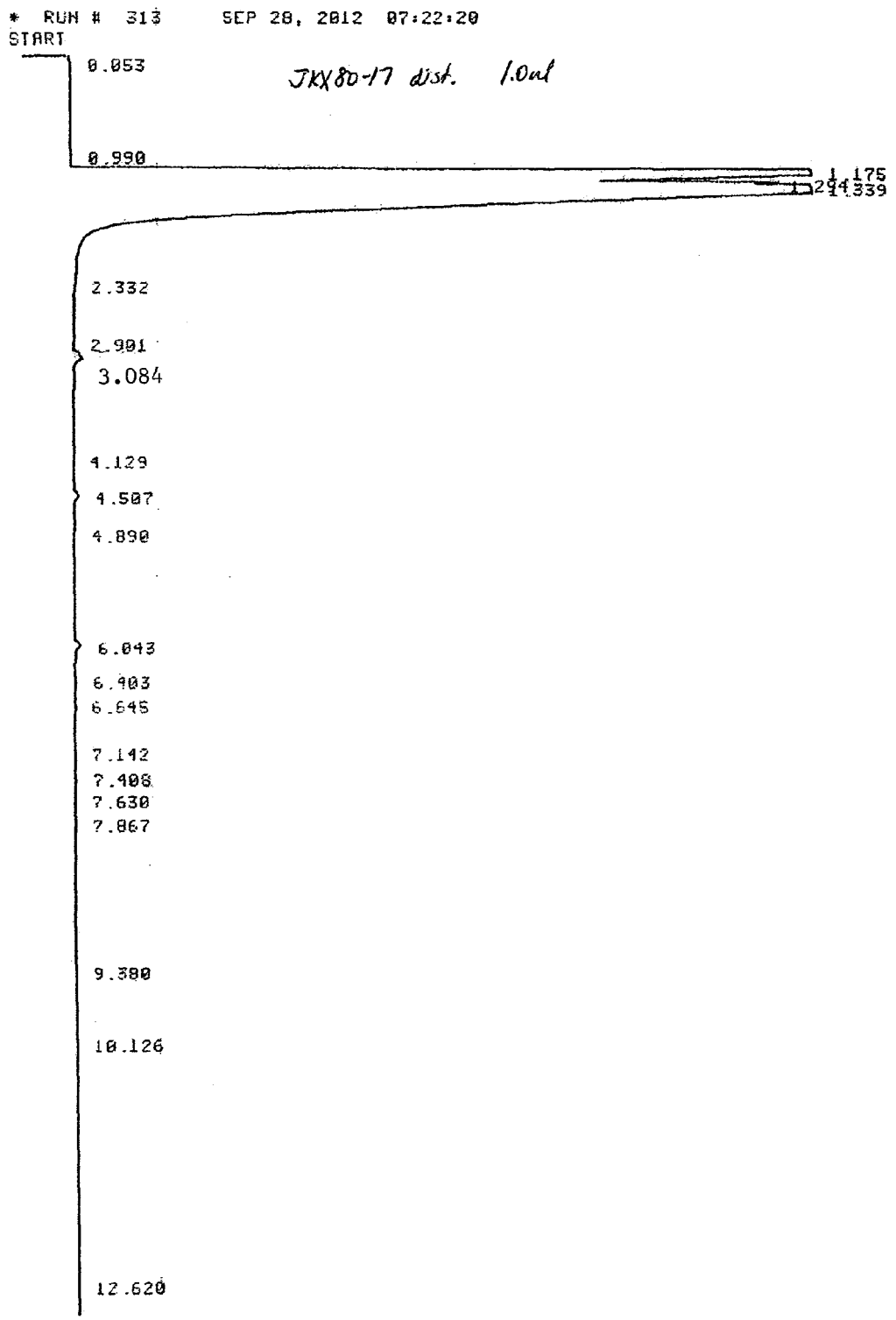
FIG. 3 is a gas chromatography spectrum of the distillate resulting from the reaction set forth in Example 1.
Figure 4:
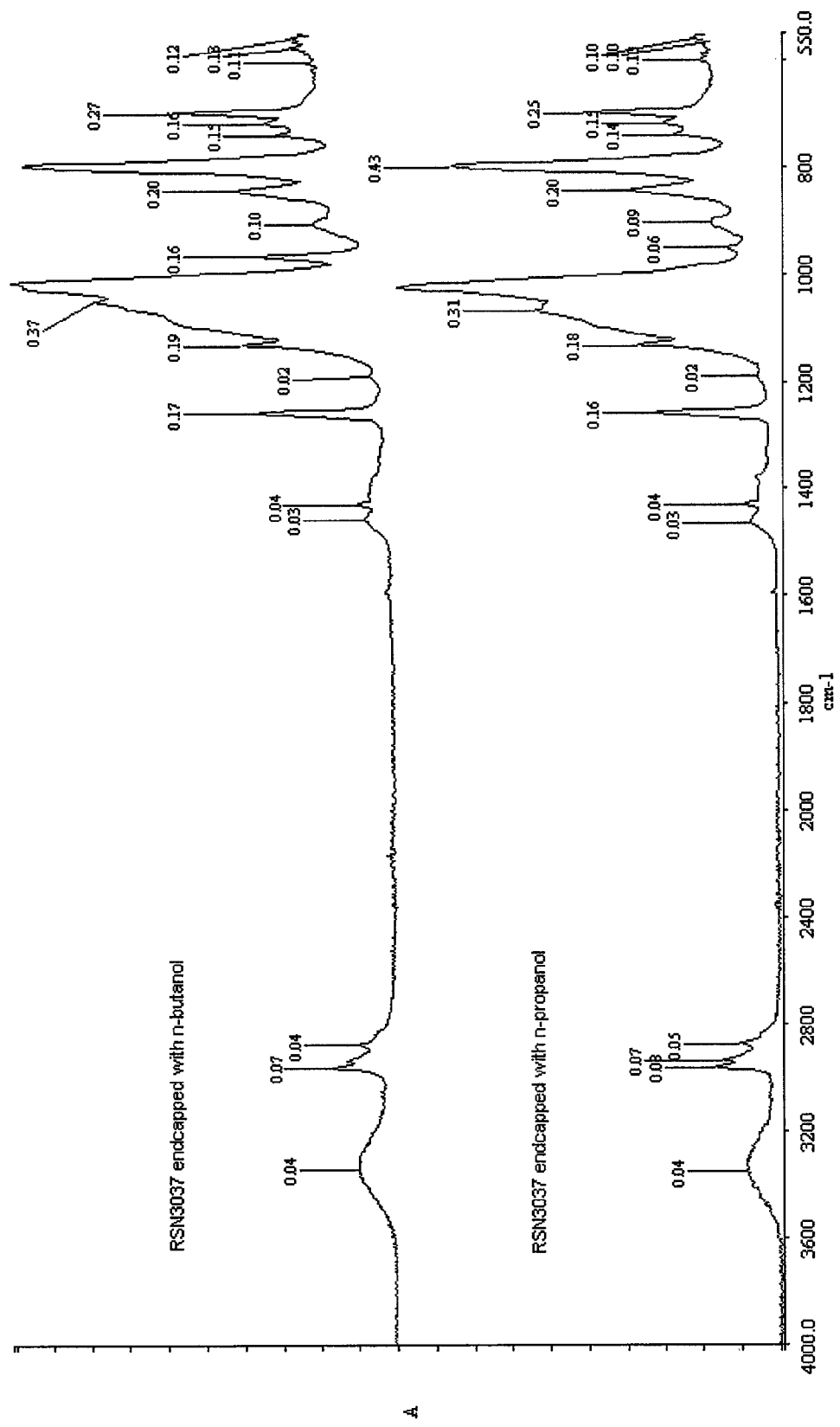
FIG. 4 is a graph of an FTIR analysis of a n-butanol and n-propanol endcapped RSN3037 showing the absorbance on the ordinate axis and the wavelength in $cm^{-1}$ on the abscissa axis.

The starting silicone intermediate and resulting alcohol endcapped silicone resin from Example 1 were analyzed by Fourier transform infrared spectroscopy (FTIR). FIGS. 1 and 2 show a FTIR spectrum of the unaltered RSN3037 silicone intermediate on top and the spectrum for the endcapped silicone resin on the bottom. FIG. 1 is a percent transmittance spectrum and FIG. 2 is an absorbance spectrum. Similarly, FIG. 4 is an absorbance spectrum comparing the n-butanol endcapped RSN3037 of Example 2 with the n-propanol endcapped RSN3037 of Example 1. The FTIR spectrum of the unaltered silicone intermediate shows a methoxy functional (corresponding to the strong absorptions at 2840 and 1191 $cm^{-1}$) methyl (corresponding to strong absorptions at 1259 $cm^{-1}$ and 750-870 $cm^{-1}$ range) phenyl (corresponding to the medium absorptions at 1594 $cm^{-1}$ and 1430 $cm^{-1}$) silicone resin. The disappearance in the lower FTIR spectrum of the peak at approximately 1191 $cm^{-1}$ shows endcapping the silicone intermediate was successful. This peak corresponds to the ($-Si-OCH_3$) methoxy groups or hydrolysable groups attached to the silicon backbone. A comparison of the before and after spectrums, shows the peak at 2840 $cm^{-1}$ has shifted to 2875 $cm^{-1}$, respectively because of the change from methoxy to propoxy functionality of the silicone resin. The broad band between 1000-1135 $cm^{-1}$ corresponds to the Si—O—Si backbone. FIG. 3 shows a gas chromatography spectrum for the distillate resulting from the reaction carried out in Example 1. FIG. 3 evidences that methanol is a byproduct of the reaction.

Room temperature stability testing and accelerated stability testing of the endcapped RSN3037, as well as other similar silicone intermediates show that the reaction described in paragraph 15 above can occur even under ambient conditions. This was evident by the gradual increase in viscosity over time. It may be possible to draw off the solvents using vacuum distillation, but the preferred method is to add heat to bring the reaction to completion more quickly.

Example 5

The endcapped silicone resins were used to produce samples of 100% solids tint pastes. A sample of each of the 100% solids tint paste was prepared from the endcapped silicone resin produced in Example 1 using a FlackTek speed mixer DAC 400 FVZ as follows. The endcapped silicone resin was added to a max 100 mid cup. Separate samples of the resin was loaded with one of the following dry pigments in the percentages listed in Table 1. These amounts were selected to represent the typical dry pigment loading levels of tint pastes currently on the market.

TABLE 1

| Dry Pigment Color | % Pigment in Resin |
| --- | --- |
| Phthalo blue | 18.5% |
| Quinacridone red | 22.8% |
| Titanium dioxide | 65.0% |
| Diketo pyrolo pyrole red (DPP red) | 33.0% |
| Organic yellow (green shade) | 30% |
| Lamp black | 16.4% |

Glass beads or zirconium beads (if necessary) were added to the cup 1:1 by resin weight ratio. The tint paste mixtures were dispersed using the speed mixer until a fineness of grind of 6-7 or greater on the Hegman scale was achieved.

Following dispersion, the viscosities of each tint pastes was measured using an ICI cone and plate viscometer. For high viscosity tint pastes, production facilities may optionally add known wetting agents to make the product easier to use. Preferably, high viscosity tint pastes generally include those having a viscosity greater than 1000 cps and display a non-Thixotropic property, Rheopectic. However, the viscosity above which the addition of wetting agents may be desired will depend upon the particular equipment and process being used by the production facility.

The tint pastes were also tested for compatibility in various coating systems including acrylics, polyurethanes, epoxies, alkyds, polyesters, room-temperature vulcanization (RTV) silicones, vinyls, cab lacquers, thermosets and thermoplastics and combinations thereof. The ratio of the tested tint paste to tint base was 1:5 by volume. The drawdowns showed improved color strength and hiding with minimal color float and mottling.

Minimal color float can be shown by the DL values between the "rub-up" area and the unaffected area on leneta drawdown cards. A DL average value of less than about 2.0, depending on color, evidences minimal color float.

| Coating System | DL average |
| --- | --- |
| RTV silicone | −1.58 |
| epoxy | −0.17 |
| alkyd | −0.69 |
| acrylic polyester urethane | −0.82 |

Opacity of the drawdown film can be measured against the black and white portion of the leneta card using an BYK color spectrometer. Hiding index of 98% or higher is considered excellent opacity. Opacity measurements using the tint pastes prepared in Example 5 in various coating types are shown below in Table 2. There was no significant variation in the opacity based upon the particular pigment that was used.

TABLE 2

| Coating Type | Thickness (mils) | % Opacity Using 100% solids tint pastes |
| --- | --- | --- |
| Acrylic polyester | 2.8-3.0 | 97.3 ± 2.7% |
| Alkyd | 5.0 | 97.9 ± 2.1% |
| Epoxy | 20.0 | 100% |
| RTV Silicone | 20.0 | 100% |

As can be seen in Table 2, the preferred 100% solids tint pastes can be used in a variety of common coating types to provide a coating having excellent opacity.

Example 6

A series of tests were conducted to examine the suitability of various alcohols and catalysts for use in the invention. The general procedure started with a methoxy functional methyl phenyl silicon resin. In each case, approximately 0.58 moles of the silicon resin intermediate was added to a 250 mL flask equipped with a stir bar, a hot plate, and a stopper fitted with a thermometer and a vacuum. The specified catalyst was added in an amount of 0.1% or 0.5% based on the weight of the resin (corresponding to 0.087-0.43 grams) and mixed for five minutes. Distilled water in an amount ranging from 0.28 to 0.29 mols was added to the mixture, which rendered the mixture hazy. Under vacuum, the mixture was heated to a range of 100-325° F. until the mixture became clear again.

Samples 1-9 each used 0.5772 moles of RSN3037, which is a methoxy functional methyl phenyl silicon resin and used 5.22 grams (0.29 mol) of distilled water. The amount and type of catalyst used as well the temperature range and time for the hydrolysis reaction for each sample is set forth below in Table 3.

Following the hydrolysis reaction, the mixture was cooled down to 150° F. or less and the specified alcohol was added in an amount ranging from 1.0 to 2.5 moles. With the vacuum off, the mixture was stirred for 1 hour at a temperature of from about 130-324° F., depending upon the number of carbon atoms in the alkyl group of the particular alcohol used. Every 15-30 minutes, a small sample was collected and analyzed by FTIR, based on the change of the 1191 cm$^{-1}$ peak. The 1191 cm$^{-1}$ peak corresponds to the methoxy functionality of the silicone intermediate. As the alcohol is condensed with the silicone intermediate the methoxy peak will diminish since the functionality will no longer be available. The 2875 cm$^{-1}$ peak corresponds to the propoxy functionality of the endcapped silicon resin. The effectiveness of the alcohol endcapping was determined by comparing the peak ratio of the propoxy functionality to the methoxy functionality. The higher the ratio the more effective the alcohol endcapping was. In nearly all cases, the reaction did not show significant further progress after 30 minutes. When further reaction has ceased to occur, the excess alcohol was vacuumed distilled leaving a clear, low viscosity resin.

TABLE 3

| | Sample | | | | |
|---|---|---|---|---|---|
| | 1 | 2 | 3 | 4 | 5 |
| Catalyst | TIPT | TIPT | TIPT | TIPT | TNBT |
| % Catalyst | 0.1 | 0.5 | 0.1 | 0.5 | 0.5 |
| Hydrolysis- ° F. | 150-185 | 150-185 | 150-175 | 150-175 | 150-175 |
| Hydrolysis Time (min) | 25 | 25 | 26 | 26 | 19 |
| Alcohol | isopropanol | isopropanol | propanol | propanol | butanol |
| Alcohol Moles | 1.2 | 1.2 | 1.2 | 1.5 | 1.2 |
| Time (min) | 30 | 240 | 46 | 200 | 73 |
| Temperature ° F. | 150-170 | 150-170 | 150-220 | 150-220 | 150-190 |
| Total Reaction Time (min) | 55 | 265 | 72 | 226 | 92 |
| peak ratio | 2.42 | 2.01 | 3.01 | 2.89 | 4.04 |

| | Sample | | | |
|---|---|---|---|---|
| | 6 | 7 | 8 | 9 |
| Catalyst | TNBT | TNBT | H3PO4 | TNBT |
| % Catalyst | 0.5 | 0.5 | 0.5 | 0.5 |
| Hydrolysis- ° F. | 150-175 | 150-160 | 150-175 | 115-150 |
| Hydrolysis Time (min) | 19 | 26 | 31 | 22 |
| Alcohol | butanol | isobutanol | benzyl alcohol | propanol |
| Alcohol Moles | 2.0 | 2.0 | 2.0 | 2.0 |
| Time (min) | 339 | 145 | 226 | 282 |
| Temperature ° F. | 150-278 | 150-180 | 150-325 | 150-215 |
| Total Reaction Time (min) | 358 | 171 | 318 | 304 |
| peak ratio | 5.58 | 2.99 | 2.73 | 7.52 |

Based on the above results, it can be seen that the use of propyl alcohol or propanol with tetra butyl titanate catalyst (Sample 9) was the preferred combination of alcohol and catalyst to form a stable polymer that can be utilized in a substantially 100% solids tint paste for coatings.

Example 7

The resulting alcohol endcapped silicon resin identified as Sample 9 in Example 6 was combined with various pigments in accordance with the procedure set forth in Example 5 to form a 100% solids tint paste. This tint paste was then compared to a commercially available tint paste in having the same pigments. The commercial tint paste used is commercially available as V-Line, which is manufactured by Chromaflo of Ashtabula, Ohio. The results are set forth below in Table 4. The viscosity was measured using ICI cone and plate viscometers.

TABLE 4

| | Supplier Tint Paste | | | |
|---|---|---|---|---|
| Color | Pigment (Wt. %) | Resin (Wt. %) | Other (Wt. %) | Viscosity (cps) |
| phthalo blue (red shade) | 18.5 | 19.8 | 61.7 | 140.0 ± 0 |
| organic yellow (green shade) | 30 | 17.9 | 52.1 | 243.3 ± 5.8 |
| Quinacridone Red | 18 | 22.8 | 59.2 | 133.3 ± 5.8 |
| Titanium Dioxide | 65 | 9.7 | 25.3 | 556.7 ± 0 |
| Lamp black | 16.4 | 20.8 | 62.8 | 583.3 ± 76.4 |

TABLE 4-continued

| | 100% Solids Tint Paste | | | |
|---|---|---|---|---|
| Color | Pigment (Wt. %) | Resin (Wt. %) | Other (Wt. %) | Viscosity (cps) |
| phthalo blue (red shade) | 18.5 | 81.5 | 0 | 545.0 ± 13.2 |
| organic yellow (green shade) | 30 | 70 | 0 | 680.0 ± 105.8 |
| Quinacridone Red | 18 | 77.2 | 0 | 360.0 ± 144.2 |
| Titanium Dioxide | 65 | 35 | 0 | 800.0 ± 0 |
| Lamp black | 16.4 | 83.6 | 0 | 493.3 ± 23.1 |

The samples of the tint paste of the current invention with the colors set forth in Table 4 were then each tested in RTV silicone, epoxy, alkyd and acrylic polyester urethane coating systems and found to have good compatibility as shown by the DL values (to measure color float) and visual (qualitative) inspection of the drawdowns.

The above descriptions of certain embodiments are made for the purpose of illustration only and are not intended to be limiting in any manner. Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is being claimed is:

1. A high solids tint paste comprising:
a silicone resin having the following formula

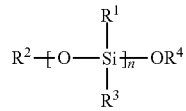

where R, and $R^3$ individually correspond to methyl, phenyl or alkyl groups, $R^2$ and $R^4$ individually correspond to an alkyl group having at least two carbon atoms or phenyl group, n is greater than zero and $R^1$, $R^2$, $R^3$, $R^4$ and n are selected so that the silicon resin is not volatile;
one or more pigments, wherein the one or more pigments is present in an amount of up to the critical pigment volume concentration based on the resin weight;
a solids concentration of from about 98 to about 100% solids; and
wherein $R^1$, $R^2$, $R^3$, $R^4$ and n are selected such that the tint paste is compatible with multiple coating types without reacting with the coating types.

2. The tint paste of claim 1 wherein the tint paste is substantially free of volatile organic compounds.

3. The tint paste of claim 1 wherein the tint paste is substantially 100% solids.

4. The tint paste of claim 1 wherein the silicone resin is chemically inert.

5. The tint paste of claim 1 wherein the silicone resin has a weight per gallon of from about 8.6 to about 8.8 lbs/gal at 25° C., a viscosity of from about 85 to about 120 cps at 25° C. and a color of less than about 1 on the Gardner scale.

6. The tint paste of claim 1 wherein $R^4$ is a propyl group.

7. The tint paste of claim 1 wherein the tint paste has a fineness of grind of at least about 6 on the Hegmen scale.

8. The tint paste of claim 1 wherein $R^4$ is selected from the group consisting of ethyl, isopropyl, butyl, benzyl, and mixtures thereof.

9. The tint paste of claim 1 wherein $R^1$ and $R^3$ is selected from the group consisting of methyl, phenyl, and mixtures thereof.

10. The tint paste of claim 1 wherein the tint paste is compatible with multiple coating selected from the group consisting of acrylics, polyurethanes, epoxies, alkyds, polyesters, room-temperature vulcanization (RTV) silicones, vinyls, cab lacquers, thermosets, thermoplastics, and combinations thereof.

11. The tint paste of claim 2 wherein
$R^4$ is selected from the group consisting of ethyl, propyl, butyl, benzyl, isomers thereof and mixtures thereof; and
$R^1$ and $R^3$ is selected from the group consisting of methyl, phenyl, and mixtures thereof.

12. The tint paste of claim 11 wherein $R^4$ is a propyl group.

13. The tint paste of claim 11 wherein the silicone resin is chemically inert.

14. The tint paste of claim 11 wherein the silicone resin has a weight per gallon of from about 8.6 to about 8.8 lbs/gal at 25° C., a viscosity of from about 85 to about 120 cps at 25° C. and a color of less than about 1 on the Gardner scale.

15. The tint paste of claim 11 wherein the tint paste is substantially 100% solids.

16. The tint paste of claim 11 wherein the tint paste has a fineness of grind of at least about 6 on the Hegmen scale.

17. The tint paste of claim 12 wherein
the tint paste is substantially 100% solids;
the tint paste has a fineness of grind of at least about 6 on the Hegmen scale;
the silicone resin is chemically inert; and
the silicone resin has a weight per gallon of from about 8.6 to about 8.8 lbs/gal at 25° C., a viscosity of from about 85 to about 120 cps at 25° C. and a color of less than about 1 on the Gardner scale.

18. A method of manufacturing a high solids tint paste comprising the steps comprising:
providing a silicone resin intermediate of the following structure

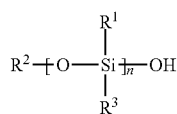

where $R^1$ and $R^3$ individually correspond to methyl, phenyl or alkyl groups, $R^2$ corresponds to an alkyl group having at least two carbon atoms or a phenyl group, and n is greater than zero;
providing an alcohol having the following structure: $R^4(OH)_m$ wherein $R^4$ corresponds to an alkyl group having at least two carbon atoms or phenyl group and m is 1;
providing a catalyst;
reacting the silicone resin with the alcohol in the presence of the catalyst for a period of time sufficient to produce an endcapped silicone resin that is non-volatile having the following formula

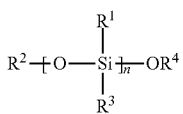

dispersing one or more pigments in the endcapped silicon resin in an amount of up to the critical pigment volume concentration based on the resin weight to form a tint paste having a solids concentration of from about 98 to about 100% solids, wherein $R^1$, $R^2$, $R^3$, $R^4$ and n are selected such that the tint paste is compatible with multiple coating types without reacting with the coating types.

19. The method of claim 18 wherein:
the silicon resin intermediate is formed from a methoxy functional silicone intermediate of the following structure

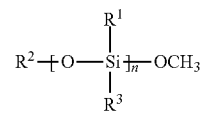

the methoxy functional silicone intermediate is reacted with the catalyst and water to form the silicone resin intermediate.

20. The method of claim 18 wherein the alcohol is selected from the group consisting of ethanol, propanol, butanol, propyl alcohol, benzyl alcohol, low molecular weight diols and isomers thereof and mixtures thereof.

21. The method of claim 18 wherein the catalyst is selected from the group consisting of organometallics, acids, and bases.

22. The method of claim 18 wherein the tint paste is compatible with multiple a coatings selected from the group consisting of acrylics, polyurethanes, epoxies, alkyds, polyesters, room-temperature vulcanization (RTV) silicones, vinyls, cab lacquers, thermosets, thermoplastics, and combinations thereof.

23. The method of claim 18 wherein the tint paste is substantially free of volatile organic compounds.

24. The method of claim 18 wherein the tint paste is substantially 100% solids.

25. The method of claim 18 wherein the endcapped silicone resin is chemically inert.

26. The method of claim 18 wherein $R^4$ is a propyl group.

27. The method of claim 18 wherein the one or more pigments is dispersed in the endcapped silicone resin until achieving a fineness of grind of at least about 6 on the Hegmen scale.

28. The method of claim 18 wherein $R^1$ and $R^3$ is selected from the group consisting of methyl, phenyl, and mixtures thereof.

29. The method of claim 18 wherein the reacting step occurs at an ambient temperature.

30. The method of claim 18 wherein
$R^1$ and $R^3$ is selected from the group consisting of methyl, phenyl, and mixtures thereof;
$R^4$ is a propyl group;
the endcapped silicone resin is chemically inert;
the catalyst is selected from the group consisting of organometallics, acids, and bases;
the tint paste is substantially free of volatile organic compounds; and
the one or more pigments is dispersed in the endcapped silicone resin until achieving a fineness of grind of at least about 6 on the Hegmen scale.

31. The method of claim 30 further comprising the step of adding the tint paste to a coating selected from the group consisting of acrylics, polyurethanes, epoxies, alkyds, polyesters, room-temperature vulcanization (RTV) silicones, vinyls, cab lacquers, thermosets, thermoplastics, and combinations thereof.

32. A tint paste produced according to the steps comprising:
providing a silicone resin intermediate of the following structure

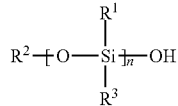

where $R^1$ and $R^3$ individually correspond to methyl, phenyl or alkyl groups, $R^2$ corresponds to an alkyl group having at least two carbon atoms or a phenyl group, and n is greater than zero
providing an alcohol having the following structure: $R^4(OH)_m$ wherein $R^4$ corresponds to an alkyl group having at least two carbon atoms or phenyl group and m is 1;
providing a catalyst;
reacting the silicone resin with the alcohol in the presence of the catalyst for a period of time sufficient to produce an endcapped silicone resin that is non-volatile having the following formula

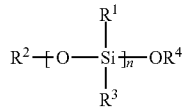

dispersing one or more pigments in the endcapped silicon resin in an amount of up to the critical pigment volume concentration based on the resin weight to form a tint paste having a solids concentration of from about 98 to about 100% solids, wherein $R^1$, $R^2$, $R^3$, $R^4$ and n are selected such that the tint paste is compatible with multiple coating types without reacting with the coating types.

33. The tint paste of claim 32 wherein:
the silicon resin intermediate is further formed from a methoxy functional silicone intermediate of the following structure

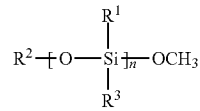

the methoxy functional silicone intermediate is reacted with the catalyst and water to form the silicone resin intermediate.

34. The tint paste of claim 32 wherein the alcohol is selected from the group consisting of ethanol, propanol, butanol, isopropyl alcohol, benzyl alcohol, low molecular weight diols and mixtures thereof.

35. The tint paste of claim 32 wherein the tint paste is substantially free of volatile organic compounds.

36. The tint paste of claim 32 wherein the endcapped silicone resin is chemically inert.

37. The tint paste of claim 32 wherein $R^4$ is a propyl group.

38. The tint paste of claim 32 wherein $R^1$ and $R^3$ is selected from the group consisting of methyl, phenyl, and mixtures thereof.

39. The tint paste of claim 32 wherein:
$R^1$ and $R^3$ is selected from the group consisting of methyl, phenyl, and mixtures thereof;
$R^4$ is a propyl group;
the endcapped silicone resin is chemically inert;
the tint paste is substantially free of volatile organic compounds; and
the tint paste has a fineness of grind of at least about 6 on the Hegmen scale.

* * * * *